Dec. 3, 1957 W. H. DU SHANE 2,815,104
PARKING LOCK FOR BRAKE MECHANISM
Filed Dec. 9, 1954
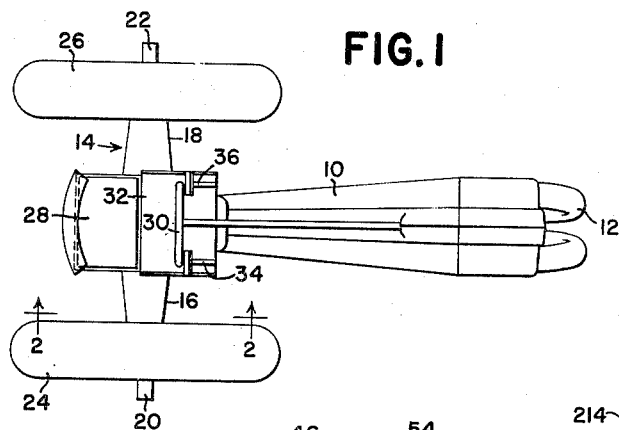
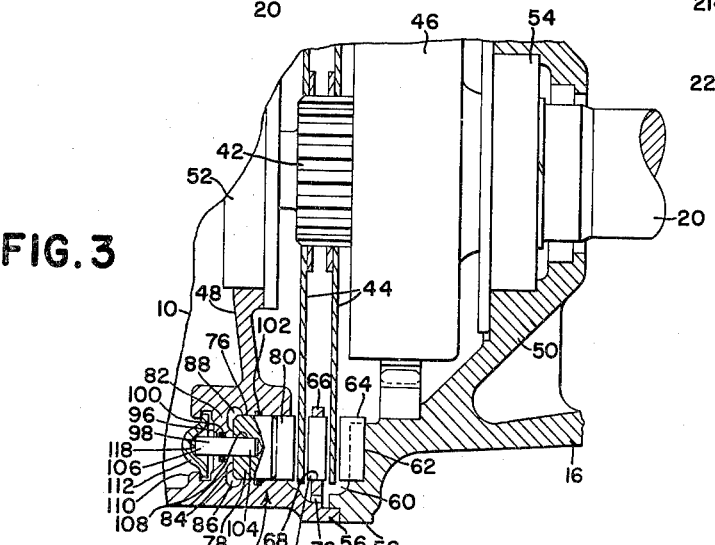
FIG. 1
FIG. 3
FIG. 5
FIG. 4
FIG. 2
INVENTOR.
W. H. DU SHANE

2,815,104

PARKING LOCK FOR BRAKE MECHANISM

Wallace H. Du Shane, Waterloo, Iowa, assignor to Deere Manufacturing Company, Dubuque, Iowa, a corporation of Iowa Application December 9, 1954, Serial No. 474,140

9 Claims. (Cl. 188—265)

This invention relates to brake mechanism and more particularly to a parking lock for holding the brake in braked position. More specifically, the invention pertains to a parking lock for use with a brake of the type utilizing one or more fluid motors in the braking system.

In the conventional automotive vehicle, the hydraulic braking system is usually supplemented by a mechanical brake applicable to either the rear wheels or the propeller shaft. In some cases, this auxiliary brake, sometimes known as a parking brake or an emergency brake, will utilize certain of the brake shoes of the basic braking system. The present invention is of the latter type; that is, it superimposes on a component of the basic braking system a control means for locking that component in brake-applied position.

The design embodied as a preferred form of the invention finds its greatest utility in an agricultural tractor equipped with hydraulic brakes of the "spot" type, a brake that is basically largely conventional and comprising one or more cooperative plates or disks squeezed together and released by one or more fluid motors selectively creating and releasing forces on lines perpendicular to the radial planes of the disks or plates. It is an object of the present invention to provide an improved parking or brake lock for a brake system of the character just referred to. In its broader aspects, the invention pertains to the improvement of a piston-locking means for a fluid motor used primarily in braking systems. Other objects of the invention relate to the provision of a simple and inexpensive brake means, a brake means that may be readily used in a basic system without materially altering that system, and other features that will become apparent as preferred embodiments of the invention are disclosed in detail in the following specification and accompanying sheet of drawings, the several figures of which are described immediately below.

Fig. 1 is a plan view of a typical agricultural tractor.

Fig. 2 is a fragmentary side view, partly in section, as seen along the line 2—2 of Fig. 1, and drawn to a somewhat enlarged scale.

Fig. 3 is a fragmentary enlarged sectional view as seen substantially along the line 3—3 of Fig. 2.

Fig. 4 is an enlarged sectional view as seen along the line 4—4 of Fig. 2.

Fig. 5 is a fragmentary sectional view, similar to Fig. 4, but showing a modified form of the invention.

The tractor chosen for the purposes of illustration comprises a longitudinal or fore-and-aft body 10 carried at its front end on a steerable wheeled truck 12 and at its rear end on transverse axle structure 14 including right- and left-hand axle housings 16 and 18, respectively, right- and left-hand axles 20 and 22, respectively, and right- and left-hand traction wheels 24 and 26, respectively. The rear portion of the body 10 carries a typical operator's seat 28 ahead of which is located a steering wheel 30 for the truck 12, and a platform 32, at the forward edge of which are right- and left-hand brake pedals 34 and 36.

The brake pedals 34 and 36 are individually associated with braking mechanisms for the right- and left-hand axles 20 and 22, as will subsequently appear. In order that the pedals may be mounted on the platform 32 on a common transverse axis, the left-hand pedal 36 is keyed to a transverse rockshaft 38 and the right-hand pedal 34 is keyed to a hollow rockshaft 40 that surrounds the right-hand end portion of the solid rockshaft 38. These details are relatively unimportant but are outlined generally for purposes of orientation. Since the braking systems at opposite sides of the tractor are substantial duplicates, only the right-hand one will be described, it being understood, of course, that the presence of similar details in the left-hand system will be supplied by the express disclosure of the details of the right-hand system.

The final drive mechanism for the tractor includes a conventional differential (not shown) from which drive is established to the respective drive axles 20 and 22. A portion of the final drive mechanism for the right-hand axle 20 is shown in Fig. 3, wherein it is seen that an input portion for the shaft 20 has thereon a gear or splined portion 42 to which are splined a pair of circular plates or disks 44. The axle 20, gear 42 and other components form part of a planetary drive system including a drum 46, all of which is journaled in internal webs or walls 48 and 50 of the body 10 by suitable bearings 52 and 54. These details are unimportant and for present purposes it may be assumed that the axle 20 is keyed directly to the gear 42 and that whatever braking pressure is applied to the plates or disks 44 will stop the axle 20.

The junction of the outer or right-hand face of the body 10 and the inner portion of the associated right-hand axle housing 16 comprises a pair of complementary flanges 56 and 58, which define an annular channel 60 in which the peripheral edges of the brake disks 44 travel when the shaft 20 and gear 42 rotate. The annular channel 60 is bordered on its right (Fig. 3) by a plurality of substantially circular recesses 62, each of which carries a cylindrical plug member 64. A ring 66 has therein a plurality of circular apertures 68 equal in number to the plug members 64, and each of these apertures carries a central cylindrical plug member 70 respectively in transverse alinement with the plug members 64. The outer periphery of the ring 66 is toothed for splined engagement at 72 with the interior of the body flange 66. Thus, the plug members 64 and 70 are fixedly positioned in angularly spaced relation as indicated in dotted lines in Fig. 2, the numeral 74 being used as a general identification reference for the components of the three brake devices, each of which includes a fluid-pressure motor, as will be described below.

The motors 74 are in this case integrated with the wall or web 48 of the body 10, which has therein three uniformly angularly spaced cylinders or fluid-receivable chambers 76, one for each motor and respectively in axial alinement with the plugs 64 and 66. Each cylinder carries therein a piston 78 and a coaxial cylindrical plug 80. When the piston 78 is moved to the right on its brake-applying stroke, it forces the plug 80 outwardly so that the proximate portions of the plates 44 are squeezed between the plugs 64, 70 and 80. The portion of the web 48 that forms each cylinder 76 includes a wall forming an end wall 82 and the piston has a proximate end face 84 which moves away from the end wall 82 on its brake-applying stroke and toward the wall 82 on its retracting stroke. The piston 78 is shown on its retracted stroke in Fig. 3, wherein it will be seen that an annular recess 86 defines means for selectively conducting fluid into and out of the chamber between the piston 78 and wall 82. In order that fluid may be supplied simultaneously to all three motors 74, the annular channels 86 for the motors 84 are interconnected by an arcuate fluid supply groove 88, the inlet 90 of which may be supplied by a brake cylinder 92 mechanically controlled by linkage 94 from the right-hand brake pedal 34. The details of the cylinder 92 are immaterial here and for present purposes may be assumed to be conventional. Suffice it to say that when the brake pedal 34 is depressed, the linkage 94 causes fluid to be transmitted under pressure from the cylinder 92 to the brake motors 74 via the interconnecting channel 88.

The end wall 82 of the cylinder 76 is coaxially bored at 96 to slidably receive a plunger 98. A fluid seal 100 prevents fluid leakage between the plunger 98 and bore 96, as does a fluid seal 102 between the cylinder 76 and piston 78.

The plunger 98 has an inner end portion 104 in engagement with the proximate portion of the piston 78 and an outer portion 106 externally or axially beyond the cylinder end wall 82. Specifically, the inner end 104 of the plunger 96 has a force fit in a bore 108 let into the proximate end face 84 of the piston 78. Although this design affords the particular piston 78 a smaller fluid-receivable area than the pistons not having plungers like 98, a decided advantage results in that there is no force between the end 106 of the plunger 98 and the surface 118 of the wedge 112 except when the parking brake is locked and, also, after the parking brake is locked in place it provides a quick means of release simply by applying the brake through the brake pedal and the wedge, being vertical, will drop to released position. Moreover, the plunger 98 occupies a position which, even though it moves endwise in its bore 96, has no effect on the volume of fluid contained in the chamber between the end 84 of the piston 78 and the end wall 82 of the cylinder 76.

From the description thus far, it will be seen that depression of the brake pedal 34 transmits fluid under pressure to the several motors 74 and that these operate simultaneously because they are fluid-connected by the groove 88. The locking means, described so far as including the plunger 98, may be associated with only one of the motors 74, since the force applicable by this means will be sufficient to lock the brake for the usual parking situation. As the piston 78 of the motor with which the brake lock is associated moves on its brake-applying stroke and also on its retracting stroke, there is no interference with this movement by the plunger 98, since the plunger is not only slidably carried in the bore 96 but is also slidably received by the bore 108 in the piston. As already indicated, the arrangement is such that the volume of fluid in the cylinder is not affected by changes in the position of the plunger 98. It will also be seen from the foregoing that if some means is provided for holding the plunger 98 in an inward position, the plunger will prevent the retracting stroke of the piston and will therefore confine the piston to a position in which it squeezes the associated portions of the brake disks 44 between the associated plugs 64, 70 and 80.

The holding of the piston 78 on its brake-applying stroke is accomplished, according to one form of the invention, by means for effecting axial positioning of the plunger selectively inwardly of the cylinder to engage and hold the piston away from the end wall 82 or outwardly to release the piston for movement on its retracting stroke. This means includes a fixed element in the form of a guide or channel 110, a movable element in the form of a wedge 112 and a third element in the form of a control rod 114. The upper end of the control rod has thereon a suitable handle 116 which is in convenient proximity to an operator on the operator's seat 28. The wedging relationship between the guide channel 110 and the wedge 112 is such that an upward force on the control rod 114 causes upward movement of the wedge 112. Since the channel is perpendicular to the axis of the plunger, and since the wedge 112 has the shape as best indicated in Fig. 4, upward movement of the wedge 112 causes the application of an axial inward force to the plunger 98, the inner surface or ramp 118 of the wedge engaging the outer end 106 of the plunger 98 and driving the plunger 98 inwardly. The angle of the ramp is such that the tendency of the piston to return on its retracting stroke cannot force the ramp downwardly; that is to say, once the ramp or wedge is pulled upwardly, it requires manual downward force to displace it so that the piston can move the plunger outwardly. Hence, no additional lock is necessary for the wedge or ramp. The lower end of the wedge or ramp may be shaped as shown at 120 to provide a stop against excess upward movement. The lower end of the control rod 114 is connected to the upper end of the wedge or ramp by a hook-shaped portion 122 which provides a stop against excess downward movement, since the portion 122 is engageable with the outer end 106 of the plunger 98.

As already indicated, a similar arrangement may be provided at the opposite side of the tractor.

In the modified form of control means for the parking brake lock (Fig. 5), the motor 74 is similar to the motor 74 already described and the common parts are readily identifiable by designation with the reference characters used before. In this modification, however, the fixed element of the lock-control means takes the form of a supporting bearing or journal 210 on which is carried a cross shaft 212 under control of a control link 214, the upper end of which may have a handle like that shown at 116.

Keyed or otherwise fixed to the shaft 212 is a movable element in the form of a cam 218 to which the lower end of the control link 214 is connected as by an apertured ear 220. In view of the description of the structure and operation of the mechanism shown in Figs. 1 through 4, it is believed that the operation of the modified form will be apparent without further elaboration.

Various features and objects of the invention not specifically enumerated will undoubtedly occur to those versed in the art, as will changes in the preferred embodiments of the invention illustrated, all of which may be achieved without departing from the spirit and scope of the invention.

What is claimed is:

1. Brake mechanism of the class described, comprising: a fluid-operated brake motor including a cylinder having a coaxially bored end wall, a brake-actuating piston movable axially in the cylinder selectively on a brake-applying stroke away from the end wall and on a retracting stroke toward said end wall, said piston having an end face facing said end wall, and fluid-conducting means for carrying fluid selectively into and out of the cylinder between the cylinder end wall and the end face of the piston; a plunger axially slidably carried in the bored end wall of the cylinder and having an inner end engageable with the end face of the piston and an outer end axially external to the cylinder; and locking means for effecting axial positioning of the plunger selectively inwardly of the cylinder to engage and hold the piston away from the end wall or outwardly to release the piston for movement on its retracting stroke, said means including a fixed element connected to the cylinder, a movable element engaging the outer end of the plunger and movably carried by the fixed element for movement relative to said fixed element in one direction to exert an inward axial force on the plunger and in the opposite direction to remove said force from the plunger, and a third element connected to and for moving the movable element.

2. The invention defined in claim 1, in which: the end face of the piston has an axial bore therein; and the inner end portion of the plunger is received in said bore.

3. The invention defined in claim 2, in which: said inner end portion of the plunger tightly fits said piston bore and is thereby rigidified with the piston.

4. The invention defined in claim 1, in which: the fixed element comprises a guide normal to the axis of the plunger; and the movable element is a wedge running in the guide.

5. The invention defined in claim 1, in which: the fixed element comprises a pivot; and the movable element is a cam carried by the pivot.

6. Brake mechanism of the class described, comprising: a fluid-operated brake motor including walls providing a fluid-receivable chamber, a piston movable in the chamber in one direction on a brake-applying stroke and in the opposite direction on a retracting stroke, and fluid-conducting means for carrying fluid selectively to and from the chamber; a piston locking and releasing member selectively positionably carried by the motor to project into the motor chamber for engagement with the piston, said member being normally disengaged from the piston to enable the piston to have free movement on its brake-applying and retracting strokes, said member being engageable with the piston substantially at the end of the brake-applying stroke to positively hold the piston against retracting; and means operatively connected to the member for selectively effecting engagement and disengagement between the member and the piston.

7. The invention defined in claim 1, in which: the fluid-conducting means includes an operating member movable in one direction for increasing the pressure in the cylinder to move the piston on its brake-applying stroke and said member being movable in the opposite direction to enable the piston to move on its retracting stroke except when the piston is held on its brake-applying stroke by the locking means; and the movable element of the locking means is movable upwardly to lock the plunger and piston and downwardly to release the plunger and piston, whereby, when the operating member further increases the fluid pressure on the cylinder after locking by the locking means, the movable element may move to released position by gravity.

8. The invention defined in claim 1, in which: the fluid-conducting means includes an operating member movable in one direction for increasing the pressure in the cylinder to move the piston on its brake-applying stroke and said member being movable in the opposite direction to enable the piston to move on its retracting stroke except when the piston is held on its brake-applying stroke by the locking means; and biasing means urging the movable element of the locking means to released position to remove said inward axial force from the plunger and piston, whereby, when the operating member further increases the fluid pressure in the cylinder after locking by the locking means, the movable element may move to released position by said biasing means.

9. Brake mechanism of the class described, comprising: a fluid-operated brake motor including a cylinder having a coaxially bored end wall, a brake-actuating piston movable axially in the cylinder selectively on a brake-applying stroke away from the end wall and on a retracting stroke toward said end wall, said piston having an end face facing said end wall, and fluid-conducting means for carrying fluid selectively into and out of the cylinder between the cylinder end wall and the end face of the piston; a plunger axially slidably carried in the bored end wall of the cylinder and having an inner end entering the cylinder and engageable with the end face of the piston and an outer end axially external to the cylinder; and locking means for effecting axial positioning of the plunger selectively inwardly of the cylinder to engage and hold the piston away from the end wall or outwardly to release the piston for movement on its retracting stroke.

References Cited in the file of this patent

UNITED STATES PATENTS

| | | |
|---|---|---|
| 1,399,591 | Uffert | Dec. 6, 1921 |
| 2,245,988 | Lambert | June 17, 1941 |